Figure 1:
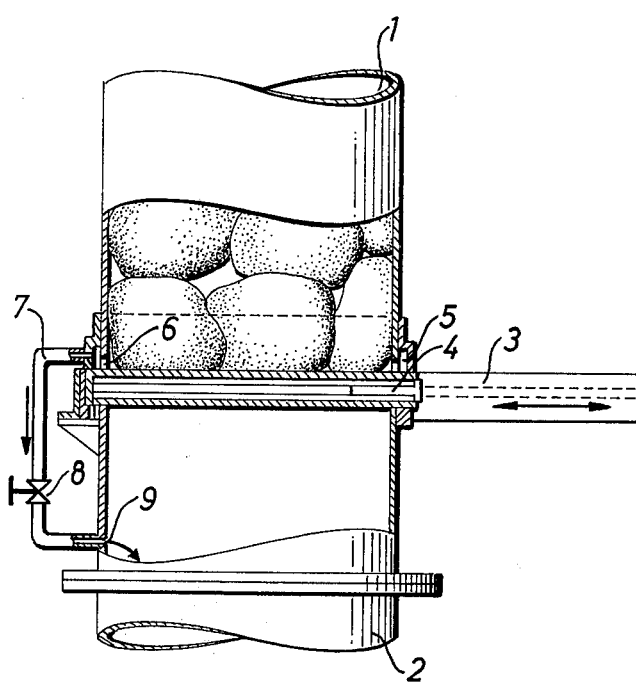

United States Patent [19]
De Feudis

[11] 3,933,393
[45] Jan. 20, 1976

[54] ARRANGEMENT AT CENTRAL INSTALLATIONS FOR PNEUMATIC TRANSPORT OF PACKAGED REFUSE

[75] Inventor: Sergio De Feudis, Nacka, Sweden

[73] Assignee: Aktiebolaget Svenska Flaktfabriken, Nacka, Sweden

[22] Filed: Mar. 4, 1974

[21] Appl. No.: 447,839

[30] Foreign Application Priority Data
Mar. 27, 1973 Sweden.............................. 7304330

[52] U.S. Cl................................................. 302/27
[51] Int. Cl.².......................................... E04F 17/12
[58] Field of Search.............................. 302/14–16, 302/27, 17

[56] References Cited
UNITED STATES PATENTS
3,490,813    1/1970    Hallstrom ......................... 302/27 X

*Primary Examiner*—Evon C. Blunk
*Assistant Examiner*—Jeffrey V. Nase
*Attorney, Agent, or Firm*—Howson and Howson

[57] ABSTRACT

In pneumatic refuse systems, each vertical branch duct for receiving the refuse is normally connected to a main suction duct through a valve which, when closed, causes the refuse to be collected in the bottom of the branch duct and, when periodically opened, releases the accumulated refuse into the main duct. Liquid in the accumulated refuse also accumulates, undesirably, on the upper side of the valve. The invention provides an annular chamber positioned around the botttom of the branch duct, and circumferentially spaced-apart openings from the annular chamber to the interior of the branch duct at the level of the top of the valve, so that liquid accumulating at the bottom of the branch duct is collected in the annular chamber; a small bypass duct extends from the annular chamber to the adjacent main duct, so that the collected liquid is sucked out of the annular chamber and into the main duct, thereby clearing the valve of liquid.

3 Claims, 2 Drawing Figures

U.S. Patent  Jan. 20, 1976  3,933,393

ARRANGEMENT AT CENTRAL INSTALLATIONS FOR PNEUMATIC TRANSPORT OF PACKAGED REFUSE

This invention relates to an arrangement at central installations for pneumatic transport of packaged refuse through a plurality of substantially vertical branch ducts connected to substantially horizontal main ducts, where the necessary vacuum of the transport air taken into the main duct(s) is maintained by means of a fan unit connected to the main ducts of the installation, which fan unit is connected on its suction side to one or more separator means, and where in each branch duct, before its connection to the main duct in question, a valve housing and movably therein a valve body, preferably of disc shape, are provided, through which at definite intervals packaged refuse is sluiced out to the main duct in question, which refuse was supplied to the branch ducts through their lockable refuse-chute doors and accumulated between said sluicing intervals.

It was found, particularly at central installations for pneumatic transport of packaged refuse from the different storeys in large multi-storey buildings, that in a great and increasing number of cases a.o. wet kitchen refuse had not been enveloped in a safe manner. Due to the refuse accumulating between the sluicing intervals above the valve means, it is also possible that in some cases the package located closest to the valve means is caused to break in some place by the weight of the refuse accumulated thereon, so that the moisture of vegetables, fish remainders etc. can flow out and as a sticky liquid film cover the valve means. This invention has as its object to eliminate this disadvantage and prevent the damaging effect, to which the valve means, i.e. the movable valve disc, may be subjected by the accumulation of liquid.

The arrangement according to the invention is characterized in that the branch duct is provided with an outside annular space for collecting liquid possibly included in the refuse, that said space communicates with the branch duct and is located above said valve housing and said movable valve body and extends along the circumference of the branch duct, and that said annular space is in permanent direct connection with said main duct through a separate pipe duct.

An advantageous embodiment of this arrangement is characterized in that the shell surface of the branch duct abutting the upper surface of the valve housing is provided with one or more apertures or slits constituting said connection. A preferred embodiment is characterized in that it comprises a throttle member in the form of a valve in said pipe duct.

Figure 2:
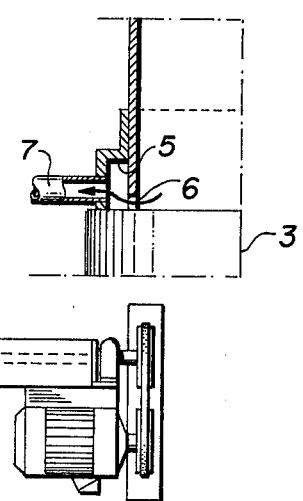

The invention is described in greater detail in the following, with reference to the accompanying drawing showing by way of an example an embodiment of the arrangement in which FIG. 1 is an elevational view, partly in section, of apparatus according to the invention; and FIG. 2 is an enlarged fragmentary view, partly in section, of the correspondingly-numbered parts at the left of the apparatus as shown in FIG. 1.

In the drawing, 1 designates one of a plurality of substantially vertical branch ducts connected to a central installation for large apartment-houses, hospitals etc., and 2 refers to a substantially horizontal main duct (not shown in detail). 3 designates a valve housing, which is provided with a disc-shaped valve body 4 reciprocating in the direction of the arrows and intended for sluicing-out operations to the main duct 2 at intervals determined by a time clock, a volumenometer, a level indicator etc. The branch duct 1, as appears specially from the enlargement, is provided with an outside annular space 5 for collecting the liquid possibly originating from deficiently packaged or leaking refuse. Particularly in summer-time, the refuse from kitchens comprises relatively large amounts of vegetable remainders, overmellow fruits etc. Also kitchen-refuse of tea-type has the tendency of delivering considerable amounts of liquid when it is being compressed in the vertical branch ducts. The accumulation of liquid on the valve disc constitutes, at least during the warm season, not only a sanitary inconveniency, but also gradually jeopardizes the easy movability of the valve disc 4. The space 5, which extends like a sleeve along the circumference of the branch duct 1, communicates through slits or a number of apertures 6 with the branch duct. 7 designates a separate, relatively narrow pipe duct, through which said space 5 communicates with the permanent vacuum in the main duct 2 which is maintained in a manner known per se by means of a fan unit (not shown) connected to all main ducts of the installation. Owing to said vacuum in the main duct 2, the valve disc 4 always can be maintained dry and free from nasty-smelling liquid. 9 designates the connection of the pipe duct 7 in the space below the valve housing 3 and valve body 4, which space with respect to pressure is connected directly to the main duct 2. 8 designates a throttle member in the form of a valve in said pipe duct 7.

I claim:

1. In apparatus for controlling the flow of refuse from a bottom portion of a vertically-extending branch duct to a pneumatic main duct positioned beneath said bottom portion of said branch duct and operated at below atmospheric pressure, comprising a valve positioned between said bottom portion of said branch duct and said main duct, said valve having an upper surface on which said refuse accumulates in said bottom portion of said branch duct when said valve is in its closed position and which permits said refuse to pass through said valve and be sucked away by said pneumatic main duct when said valve is in its open position, said refuse being capable of producing on the upper surface of said valve an accumulation of liquid harmful to the operation of said valve, the improvement comprising an annular chamber extending about said bottom portion of said branch duct at the level of the upper surface of said valve and having at least one opening providing liquid communication between said annular chamber and the interior of said branch duct at the level of said upper surface of said valve, thereby to collect liquid accumulating at said upper surface of said valve, and means connecting said annular chamber to the interior of said main duct when said valve is closed, so that the suction exerted by said lower-than-atmospheric pressure in said main duct removes said collected liquid from said annular chamber to said main duct to maintain said upper surface of said valve substantially dry.

2. The apparatus of claim 1, in which said means connecting said annular chamber to said interior of said main duct comprises a bypass duct permanently connected between said annular chamber and said main duct.

3. The apparatus of claim 2, in which said at least one opening comprises a plurality of openings spaced about said lower portion of said branch duct, and said apparatus comprises throttle valve means in said bypass duct for adjusting the cross-sectional size of said bypass duct.

* * * * *